US012542379B2

(12) United States Patent
Holzkamp et al.

(10) Patent No.: US 12,542,379 B2
(45) Date of Patent: Feb. 3, 2026

(54) PLUG CONNECTION INCLUDING A PLUG CONNECTOR AND A PLUG SOCKET

(71) Applicant: WAGO Verwaltungsgesellschaft mbH, Minden (DE)

(72) Inventors: Timo Manuel Holzkamp, Extertal (DE); Martin Heggemann, Herford (DE); Jan-Philipp Jansen, Hille (DE)

(73) Assignee: Wago Verwaltungsgesellschaft mbH, Minden (DE)

( * ) Notice: Subject to any disclaimer, the term of this patent is extended or adjusted under 35 U.S.C. 154(b) by 281 days.

(21) Appl. No.: 18/387,366

(22) Filed: Nov. 6, 2023

(65) Prior Publication Data

US 2024/0154326 A1 May 9, 2024

(30) Foreign Application Priority Data

Nov. 7, 2022 (DE) .................... 20 2022 106 240.4

(51) Int. Cl.
*H01R 4/48* (2006.01)

(52) U.S. Cl.
CPC ................................ *H01R 4/48365* (2023.08)

(58) Field of Classification Search
CPC .. H01R 4/48365; H01R 4/483; H01R 4/4835; H01R 12/515; H01R 24/00; H01R 13/40; H01R 13/502; H01R 13/629; H01R 13/639
See application file for complete search history.

(56) References Cited

U.S. PATENT DOCUMENTS

| | | | | |
|---|---|---|---|---|
| 8,430,697 | B2 | 4/2013 | Gassauer et al. | |
| 9,614,306 | B2 | 4/2017 | Hewer et al. | |
| 11,817,642 | B2 * | 11/2023 | Böcker | H01R 12/716 |
| 11,894,630 | B2 * | 2/2024 | Goren | H01R 4/4835 |
| 11,909,155 | B2 | 2/2024 | Koellmann et al. | |
| 2010/0173531 | A1 * | 7/2010 | Holste | H01R 4/4821 439/700 |
| 2018/0076536 | A1 * | 3/2018 | Hartmann | H01R 4/5066 |

FOREIGN PATENT DOCUMENTS

| | | | | |
|---|---|---|---|---|
| DE | 102007052462 | B4 * | 3/2010 | H01R 9/2458 |
| DE | 102010010259 | B4 | 2/2012 | |
| DE | 102014116237 | A1 | 5/2016 | |
| DE | 202016105358 | U1 | 1/2018 | |
| DE | 102019108291 | A1 | 10/2020 | |
| DE | 202020100621 | U1 | 5/2021 | |

* cited by examiner

*Primary Examiner* — Travis S Chambers
(74) *Attorney, Agent, or Firm* — Muncy, Geissler, Olds & Lowe, P.C.

(57) ABSTRACT

A plug connection including a plug connector and a plug socket for electrically conductively connecting a circuit board. The plug connector has an insulating housing with a conductor insertion opening for guiding an electrical conductor into the insulating housing. A contact insert is received in the insulating housing, which has a busbar and a clamping spring. The insulating housing having a contact pin receiving opening for guiding a contact pin into the insulating housing. The busbar having a second clamping point for the contact pin. An actuating element is configured to open and/or close the first clamping point. An actuation of the actuating element is blocked by at least one of the insulating walls in an assembled state of the plug connector and the plug socket.

11 Claims, 7 Drawing Sheets

PLUG CONNECTION INCLUDING A PLUG CONNECTOR AND A PLUG SOCKET

This nonprovisional application claims priority under 35 U.S.C. § 119(a) to German Patent Application No. 20 2022 106 240.4, which was filed in Germany on Nov. 7, 2022, and which is herein incorporated by reference.

BACKGROUND OF THE INVENTION

Field of the Invention

The invention relates to a plug connection including a plug connector and a plug socket for electrically conductively connecting a circuit board, the plug connector having an insulating housing with a conductor insertion opening for guiding an electrical conductor into the insulating housing, a contact insert being received in the insulating housing, the contact insert having a busbar and a clamping spring, the busbar and the clamping spring forming a first clamping point for the electrical conductor, and the insulating housing having a contact pin receiving opening for guiding a contact pin into the insulating housing, the busbar having a second clamping point for the contact pin, and including an actuating element, the actuating element being configured to open and/or close the first clamping point, and the plug socket having insulating walls and contact pins, the plug connector being able to be plugged into the plug socket, and the contact pins electrically conductively contacting the busbar of the plug connector through the contact pin receiving opening.

Description of the Background Art

DE 10 2019 108 291 A1, which corresponds to US 2022/0013929, which is incorporated herein by reference, and which shows a plug connector that includes a contact insert, the contact insert having a busbar and a clamping spring, which together form a clamping point for an electrical conductor to be clamped. The clamping point may be opened or closed via an actuating lever.

DE 10 2010 010 259 B4, which corresponds to US 2011/0217879, which is incorporated herein by reference, and which discloses a plug socket having an opening, a contact pin being insertable through the opening for connection to an associated plug connector. The plug connector may be plugged into the plug socket and has an actuating pushbutton on a front side, the actuating pushbutton being configured to open or close a clamping point of the plug connector.

Cross jumpers, such as those from DE 20 2020 100 621 U1, which is incorporated herein by reference, are able to block a deflection of the actuating element in a corresponding plug connector after insertion. However, an additional element is needed for the plug connection, and the corresponding clamping points are electrically conductively connected by the cross jumper. An electrically conductive connection between the individual clamping points is, however, not always desired.

SUMMARY OF THE INVENTION

It is therefore an object of the present invention to provide an improved plug connection.

Thus, in an example, it is proposed that an actuation of the actuating element is blocked by at least one of the insulating walls in an assembled state of the plug connector and the plug socket.

This has the advantage that, in the plugged-in state of the plug connector in the plug socket, the insulating walls of the plug socket block an actuation of the actuating element, so that the electrical conductor may be clamped or released on the plug connector only when the plug connector is pulled out of the plug socket. An unintentional release of the electrical conductor in the plugged-in state is thus also avoided. Single-wire conductors, stranded conductors, or stranded conductors having a wire end ferrule may be used as electrical conductors, single-wire conductors or conductors having a wire end ferrule possibly being able to be plugged in directly without actuating the actuating element.

A circuit board plug connection may furthermore be provided thereby, which has a compact design and is easy to use for the user. Only a small installation space is needed, it being possible to mount the plug connection on a circuit board in a time-efficient manner, due to the time-saving operation.

The insulating walls of the plug socket may be provided with a trough-shaped design, the insulating walls forming a receiving opening for the plug connector, into which the plug connector may be inserted. It is conceivable that the receiving opening may be designed as a receiving opening which is open on one side.

The insulating walls may form, in particular, a receiving space for the plug connector. The insulating walls may furthermore form a receiving space which has a receiving opening for the plug connector which is open on one side. The plug connector may thus be inserted into the plug socket only from one side.

This has the advantage that the plug connector is securely seated in the plug socket and is protected against external influences in that the plug connector is surrounded by the insulating walls of the plug socket. Moreover, the plug connector may be guided into the plug socket only in one direction, so that the probability of a mismating is reduced. An increased vibration resistance may also be ensured, and the plug connection may be advantageously used for casting applications, since the casting compound is unable to enter the plug socket.

The contact pin receiving opening and the conductor insertion opening may be arranged on opposite sides or on two different sides of the insulating housing.

This has the advantage that a structurally simple plug connection may be provided, which may be mounted on a circuit board.

Two eyelets situated opposite each other may be arranged on the plug socket. It is conceivable that a seal or a closure element may block a release of the plug connector with respect to the plug socket, the seal or the closure element engaging through the eyelets.

This has the advantage that the plug connector is unable to be removed from the plug socket without detaching the closure element or the seal beforehand. A removal by unauthorized persons may be prevented thereby.

A seal is, for example, a type of sealing element for the plug connection. Attaching a seal to the eyelets of the plug connection makes it possible to determine later on whether access to the plug connection was or was not achieved, since it may not be indestructibly removed.

A closure element may be indestructibly removed. For example, a rod may be used as the closure element, which is guided through both eyelets and is secured with the aid of a screw connection. However, other latching connections, for example, are also conceivable. An unintentional removal of the plug connector may be prevented in this way.

The plug connector and/or the plug socket may have a mismating protection.

The mismating protection may be formed by different geometric shapes, for example a chamfer made from insulating material on the plug socket. However, other types are also conceivable, such as crosspieces made from insulating material, which protrude into a receiving space of the plug socket.

A mismating protection may also be achieved by combining multiple of these examples. The probability of an incorrect assembly of the plug connector and the plug socket is further reduced in this way.

A coding or coding possibility is established by the mismating protection, so that the plug connector may be guided into the plug socket only in a certain orientation. This has the advantage that a mismating of the plug connector with the plug socket may be excluded, or at least the probability of a mismating is greatly reduced.

The actuating element may be an actuating lever, the actuating lever being supported on the insulating housing, pivotable around a pivot axis.

An actuating element may be provided thereby, whose actuation is blocked by interaction of the insulating walls with the actuating lever in the plugged-in state of the plug connector into the plug socket, in that the pivoting around the pivot axis is for opening the first clamping point is prevented.

It is conceivable that an operating section of the actuating lever is situated opposite and/or abuts an inner wall of one of the insulating walls.

The operating section may run, in particular, in parallel to at least one of the insulating walls. As a result, a deflection of the actuating level is blocked by the corresponding insulating wall in a structurally simple manner.

The actuating element may have an actuating section, the actuating section and a clamping leg of the clamping spring being configured in such a way as to open and/or close the first clamping point.

The actuating section of the actuating element indirectly or directly engages with the clamping spring, so that the clamping spring is pivoted by an actuation of the actuating element in such a way that the clamping point is transferred either into an opened position for inserting the electrical conductor or into a closed position, in which an electrical conductor may not be guided to the clamping point. A mechanism which transfers the clamping point into an opened position or closed position may be provided by the actuating element in a structurally simple manner.

A strain relief element for relieving the strain of the plugged-in electrical conductor may be arranged on the plug connector.

A strain relief is, in particular, a mechanical protective device for flexible electrical conductors. The flexible electrical conductors are secured by the strain relief against being yanked out of the clamping point. The strain relief may be designed, for example, as a cable clip, screw connection, or plates having a multiplicity of holes. However, other forms of strain relief systems are also conceivable. In particular, the strain relief element may be designed as a strain relief plate, which is arranged beneath the conductor insertion openings of the plug connector.

A projection may be arranged on an inside of the plug socket. This projection may be designed, for example, as a cam. A plugged-in plug connector may be secured by this projection against being pulled out unintentionally. The projection, or cam, is used as a latching connection, which latches the plug connector with respect to the plug socket. The plug connector and the plug socket may thus be moved against each other only with difficulty, due to a force fit of the projection. However, other latching connections are also conceivable, for example a form-fitting connection.

A grip plate or a gripping element may be arranged on the plug connection, the plug connector being able to be released from the plug socket by the gripping element. This facilitates a possible disassembly of the plug connection.

The plug connection may also have an insulation displacement connection. Even non-stripped electrical conductors may be connected by the insulation displacement connection, the insulation displacement connection cutting through the insulation of the electrical conductor and electrically conductively contacting the latter.

The plug connection can have a multiplicity of clamping springs, it being possible to form a first clamping point via each of the clamping springs. A multiplicity of electrical conductors may thus be electrically conductively connected to the plug connection. A multipole, in particular a 2-pole, 3-pole, or 4-pole, plug connector may be provided thereby. Moreover, multiple second clamping points may also be provided, which are each configured to electrically conductively connect a contact pin to the plug connection. The contact pins may be arranged, for example, on a circuit board and be guided into the plug connector.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
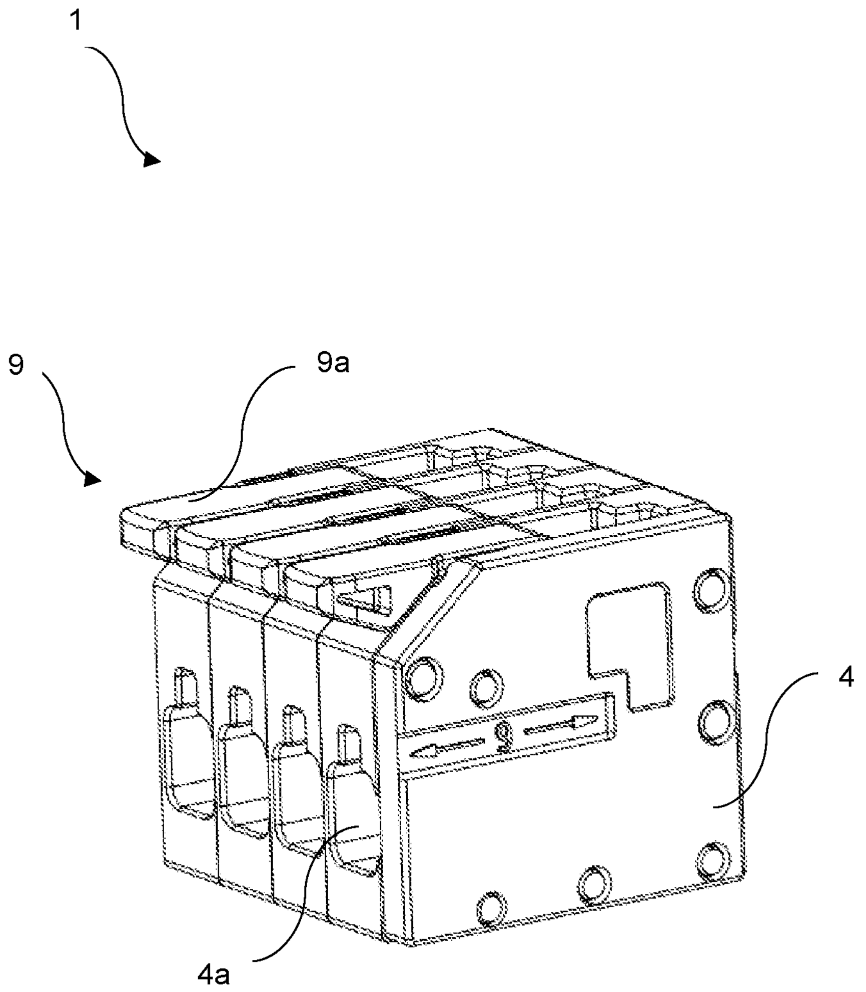
FIG. 1 shows a perspective view of a plug connector for a plug connection according to the invention.
Figure 6A:
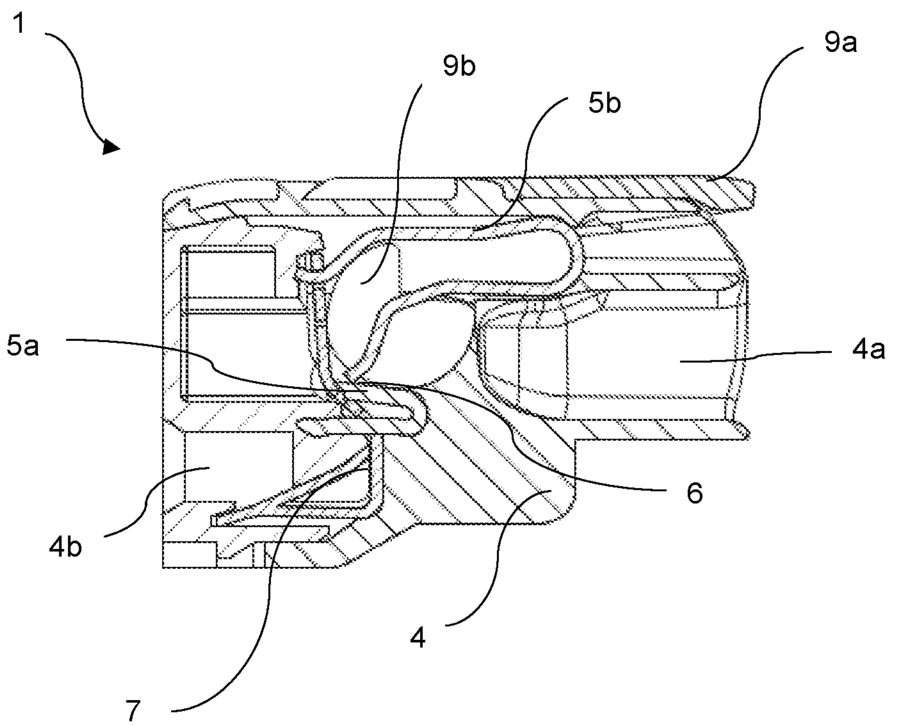
FIG. 6*a* shows a side sectional view of a plug connector for a plug connection according to the invention in an example.
Figure 6B:
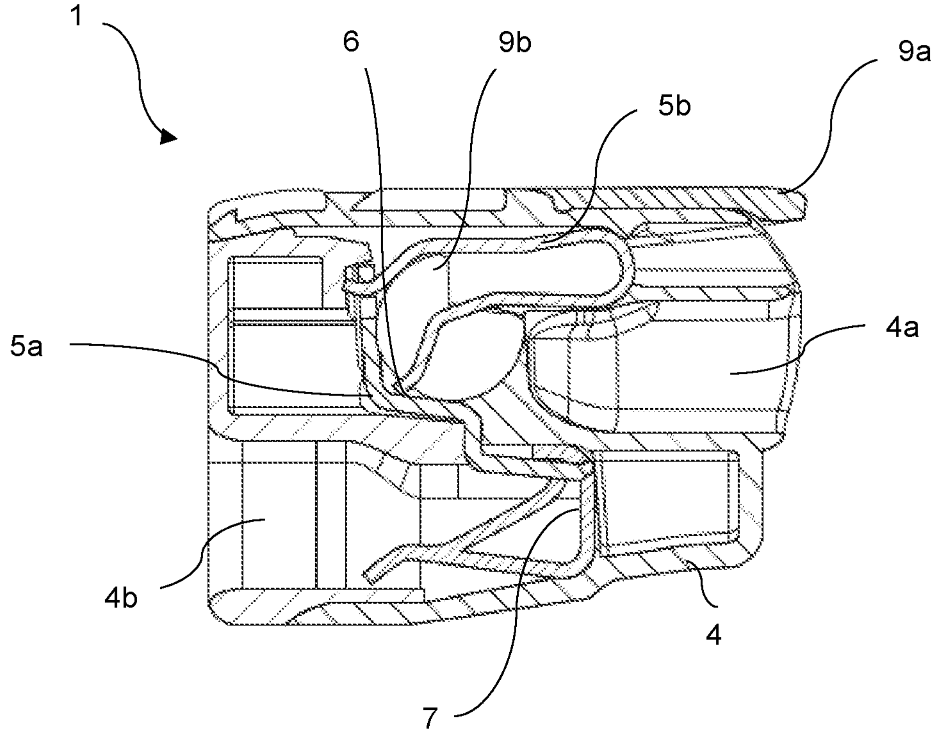
FIG. 6*b* shows a side sectional view of a plug connector for a plug connection according to the invention in an example.

FIG. 1 shows a perspective view of a plug connector 1 for a plug connection according to the invention. Plug connector 1 includes an insulating housing 4, insulating housing 4 having four conductor insertion openings 4_a_ for guiding an electrical conductor into the insulating housing 4. FIGS. 6_a_ and 6_b_ each show a side sectional view of a specific embodiment of a plug connector 1. A possible inner structure of the plug connector is clear from FIGS. 6_a_ and 6_b_.

A contact insert 5 is received in insulating housing 4, contact insert 5 having a busbar 5_a_ and a clamping spring 5_b_. Busbar 5_a_ and clamping spring 5_b_ form a first clamping point 6 for the electrical conductor. Insulating housing 4 further has a contact pin receiving opening 4_b_ for guiding a contact pin 8 into insulating housing 4, busbar 5_a_ having a second clamping point 7 for contact pin 8. The second clamping point may be formed, for example, by a further clamping spring. However, it is also conceivable that clamping spring 5_b_ for first clamping point 6 is also designed in such a way that, with its free ends, it forms first clamping point 6 and second clamping point 7 with busbar 5_a_. Insulating housing 4 has four contact pin receiving openings 4_b_ for guiding a contact pin 8 to second clamping point 7 in insulating housing 4. Contact pin receiving openings 4_b_ and conductor insertion openings 4_a_ are arranged on opposite sides of insulating housing 4.

It is clear from the combined examination of FIGS. 1, 6_a_, and 6_b_ that plug connector 1 has an actuating element 9, actuating element 9 being configured to open and/or close first clamping point 6. Actuating element 9 is designed as an actuating lever 9_a_, actuating lever 9_a_ being supported on insulating housing 4, pivotable around a pivot axis. Actuating lever 9_a_ has an operating section, with the aid of which the user may manually pivot actuating lever 9_a_. Actuating lever 9_a_ also has an actuating section 9_b_, actuating section 9_b_ interacting with a clamping leg of clamping spring 5_b_ in such a way that it opens and/or closes first clamping point 6 by pivoting the operating section.

Figure 2A:
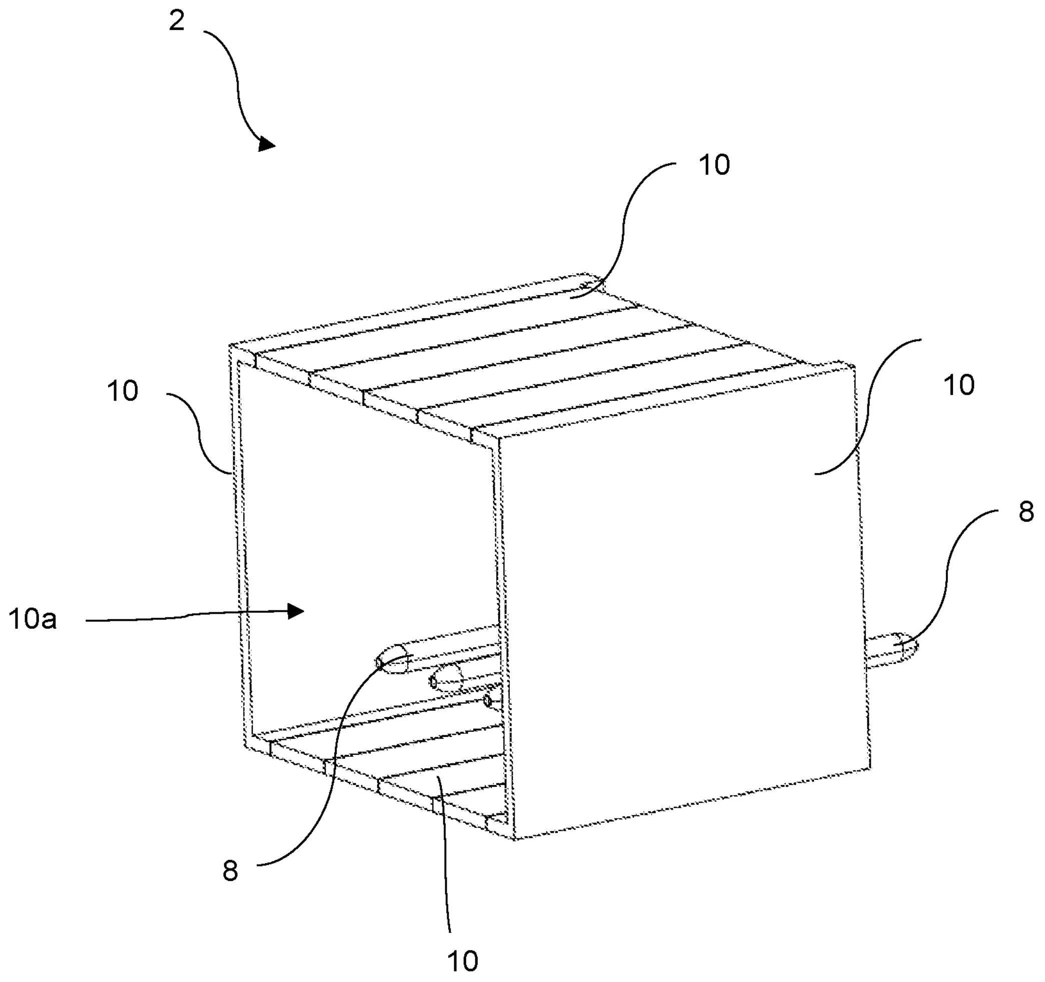
FIG. 2*a* shows a perspective view of a plug socket for a plug connection according to the invention.
Figure 2B:
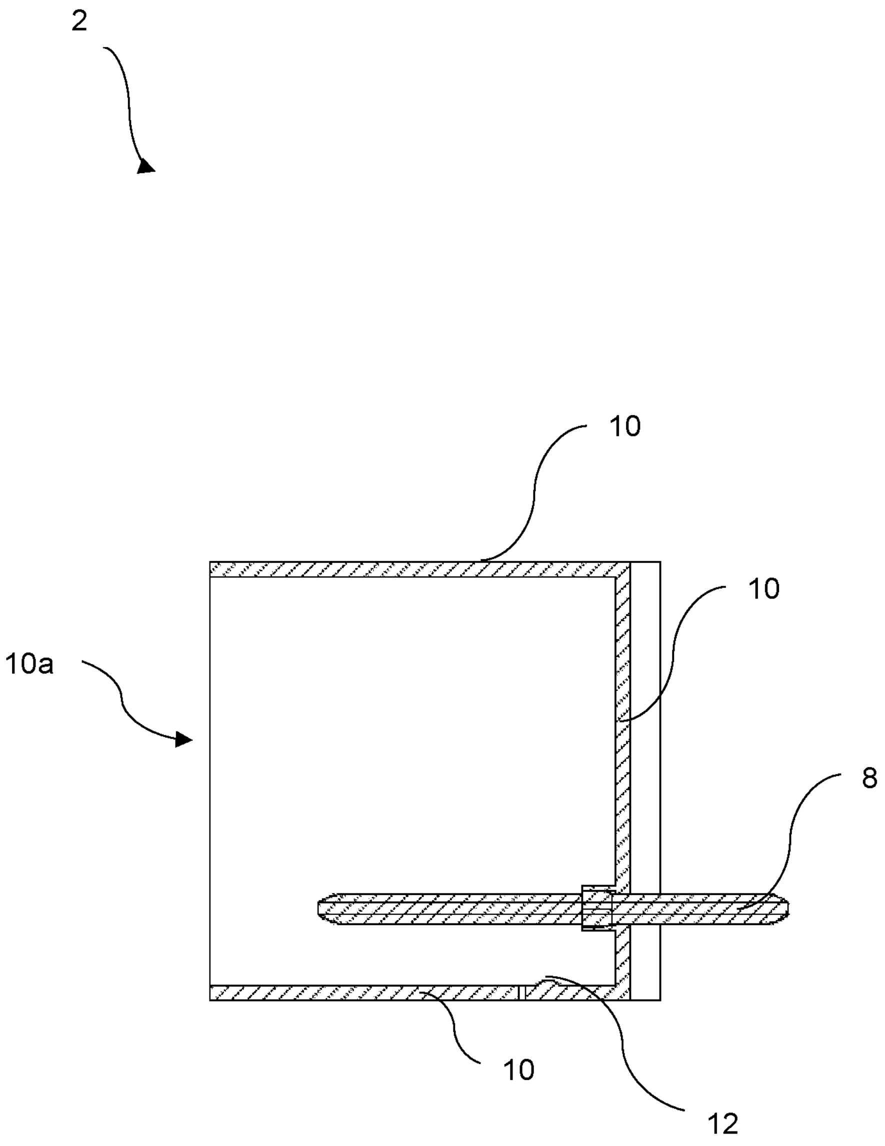
FIG. 2*b* shows a cutaway side view of the plug socket according to FIG. 2*a;*

FIG. 2_a_ shows a perspective view of a plug socket 2 for a plug connection according to the invention. FIG. 2_b_ shows a cutaway side view of plug socket 2 according to FIG. 2_a_. Plug socket 2 has insulating walls 10 and contact pins 8, for example a plug connector 1 according to FIGS. 1, 6_a_, and 6_b_ being able to be plugged into plug socket 2, and contact pins 8 being able to electrically conductively contact busbar 5_a_ of plug connector 1 through contact pin receiving opening 4_b_.

It is clear that insulating walls 10 form a receiving opening 10_a_ and a receiving space for plug connector 1 connected thereto. Plug connector 1 would then be limited by insulating walls 10 in this exemplary embodiment. Due to insulating walls 10, receiving opening 10_a_ is designed as a receiving opening 10_a_ open on one side. Plug connector 1 may thus be inserted into plug socket 2 only via one side.

It is also apparent that a projection 12 is arranged on the inside of plug socket 2. This projection 12 may be designed, for example, as a cam. A plugged-in plug connector 1 may be secured by this projection 12 against being pulled out unintentionally. Projection 12, or the cam, is used as a latching connection, which latches plug connector 1 with respect to plug socket 2.

Figure 3:
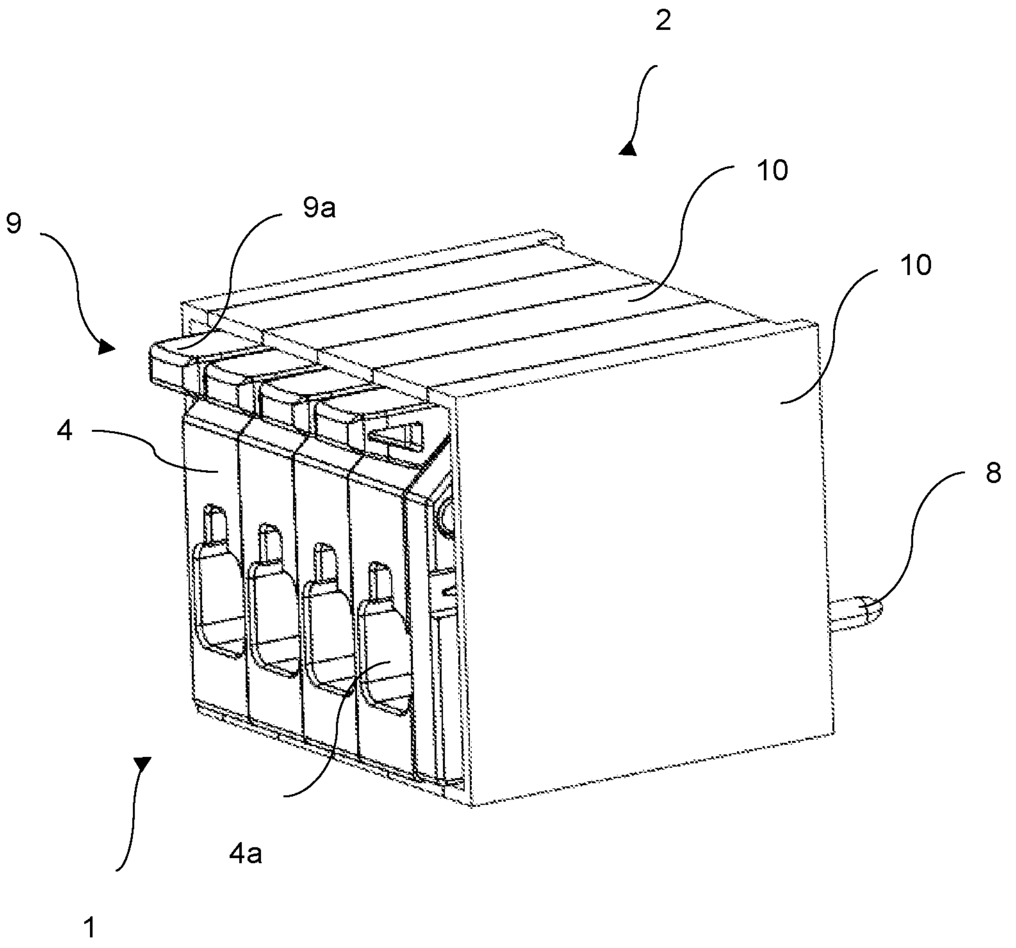
FIG. 3 shows a plug connection according to the invention, made up of the plug connector according to FIG. 1 and the plug socket according to FIGS. 2*a* through 2*b;*

FIG. 3 shows a plug connection according to the invention, made up of plug connector 1 according to FIG. 1 and the plug socket according to FIGS. 2_a_ through 2_b_. It is clear that an actuation of actuating lever 9_a_ is blocked by insulating walls 10 in an assembled state of plug connector 1 and plug socket 2. A deflection of the actuating section of actuating lever 9_a_ is not possible, since actuating lever 9_a_ is mechanically blocked by one of insulating walls 10.

Figure 4:
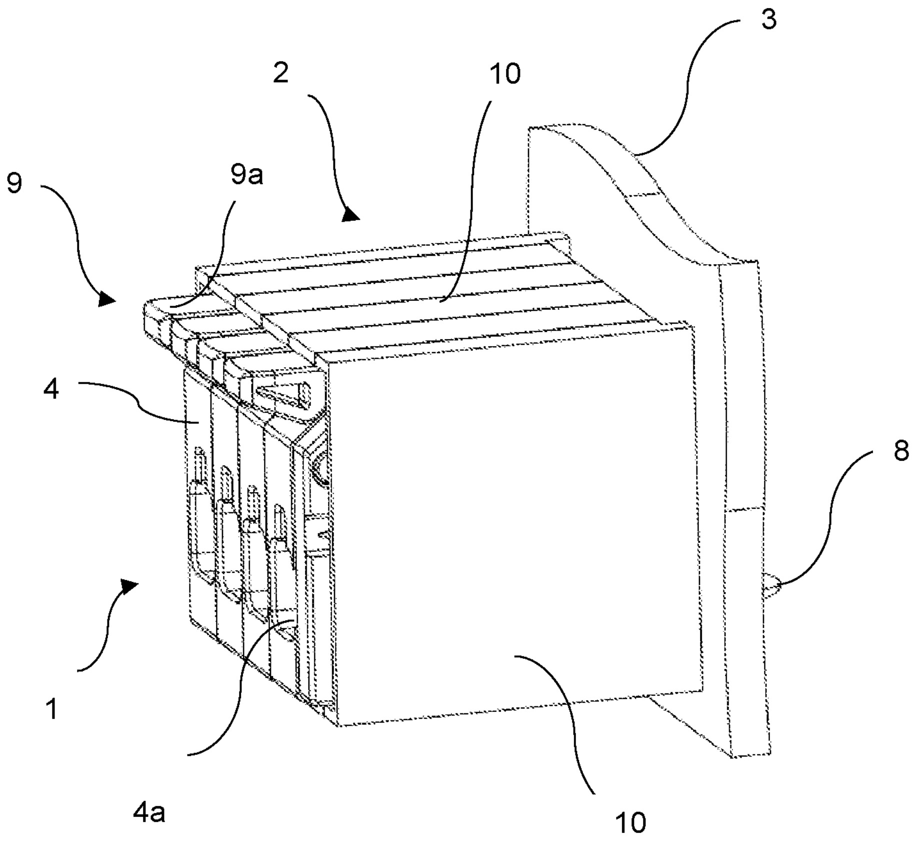
FIG. 4 shows the plug connection according to the invention according to FIG. 3 on a circuit board.

FIG. 4 shows the plug connection according to the invention according to FIG. 3 on a circuit board 3. The easy mounting of the plug connection via contact pins 8 of contact socket 2 is clear.

Figure 5:
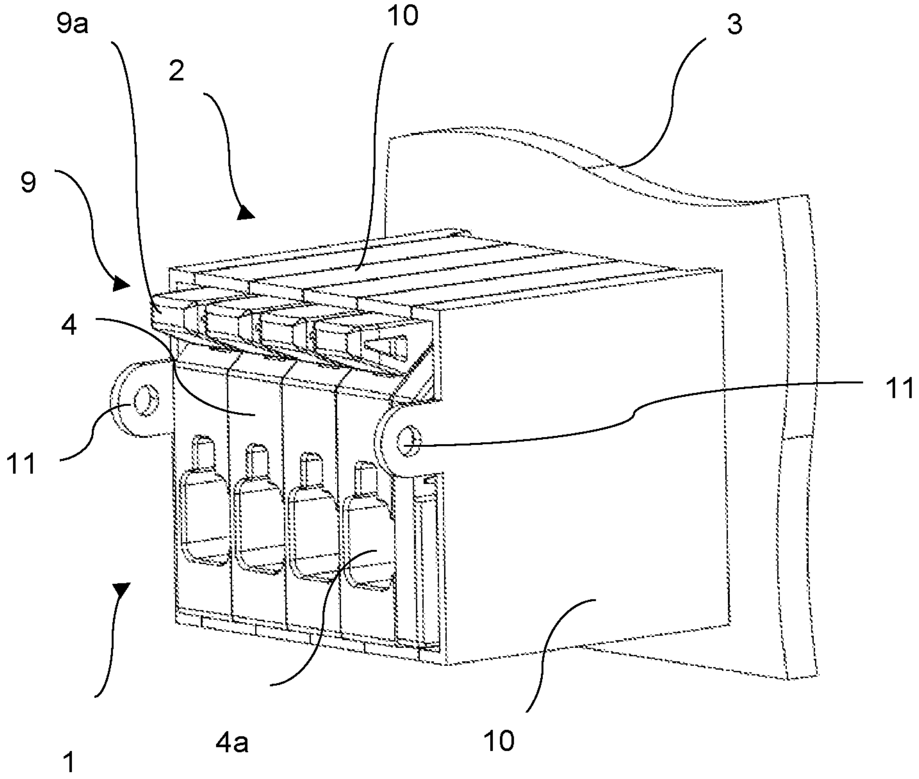
FIG. 5 shows a plug connection according to the invention unit in an example.

FIG. 5 shows a plug connection according to the invention unit in a second specific embodiment. In contrast to the specific embodiment according to FIGS. 3 and 4, two eyelets 11 are arranged on plug socket 2 of the plug connection. In this exemplary embodiment, eyelets 11 are arranged on two opposite side walls 10 in the area of receiving opening 10_a_, the eyelets extending past plugged-in plug connector 1. For example, a closure element or a seal may be mounted via eyelets 11.

This has the advantage that plug connector 1 is unable to be removed from plug socket 2 without detaching the closure element or the seal beforehand. For example, a rod may be used as the closure element, which is guided through both eyelets 11 and is secured with the aid of a screw connection. However, other latching connections, for example, are also conceivable. An unintentional removal of the plug connector may be prevented in this way.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A plug connection comprising:
a plug connector; and
a plug socket for electrically conductively connecting a circuit board,
wherein the plug connector comprises:
an insulating housing with a conductor insertion opening for guiding an electrical conductor into the insulating housing, the insulating housing having a contact pin receiving opening for guiding a contact pin into the insulating housing;
a contact insert being received in the insulating housing, the contact insert having a busbar and a clamping spring, the busbar and the clamping spring forming a first clamping point for the electrical conductor, the busbar having a second clamping point for the contact pin; and
an actuating element configured to open and/or close the first clamping point,
wherein the plug socket comprises:
insulating walls; and
contact pins,
wherein the plug connector is adapted to be plugged into the plug socket such that the contact pins electrically conductively contact the busbar of the plug connector through the contact pin receiving opening, and
wherein an actuation of the actuating element is blocked by at least one of the insulating walls in an assembled state of the plug connector and the plug socket.

2. The plug connection according to claim 1, wherein the insulating walls of the plug socket are provided with a trough-shaped design, wherein the insulating walls form a receiving opening for the plug connector into which the plug connector is adapted to be inserted.

3. The plug connection according to claim 2, wherein the receiving opening is designed as a receiving opening that is open on one side.

4. The plug connection according to claim 1, wherein the contact pin receiving opening and the conductor insertion opening are arranged on opposite sides of the insulating housing.

5. The plug connection according to claim 1, wherein two eyelets are arranged opposite each other on the plug socket.

6. The plug connection according to claim 5, wherein a seal or a closure element blocks a release of the plug connector with the respect to the plug socket, the seal or the closure element engaging through the eyelets.

7. The plug connection according to claim 1, wherein the plug connector and/or the plug socket have a mismating protection.

8. The plug connection according to claim 1, wherein the actuating element is an actuating lever, the actuating lever being supported on the insulating housing pivotable around a pivot axis.

9. The plug connection according to claim 8, wherein an operating section of the actuating lever is arranged opposite and/or abuts an inner wall of one of the insulating walls.

10. The plug connection according to claim 1, wherein the actuating element has an actuating section, the actuating section and a clamping leg of the clamping spring being configured to open and/or close the first clamping point.

11. The plug connection according to claim 1, wherein a strain relief element for relieving the strain of the plugged-in electrical conductor is arranged on the plug connector.

* * * * *